United States Patent [19]

Fugate et al.

[11] E Patent Number: Re. 31,813

[45] Reissued Date of Patent: Jan. 22, 1985

[54] PRINT WIRE SOLENOID

[75] Inventors: Philip E. Fugate, Dayton; Kenneth L. Roy, Centerville, both of Ohio

[73] Assignee: Ledex, Inc., Vandalia, Ohio

[21] Appl. No.: 502,377

[22] Filed: Jun. 8, 1983

Related U.S. Patent Documents

Reissue of:

[64] Patent No.: 4,272,748
Issued: Jun. 9, 1981
Appl. No.: 116,718
Filed: Jan. 30, 1980

U.S. Applications:

[63] Continuation-in-part of Ser. No. 908,153, May 22, 1978, Pat. No. 4,200,401.

[51] Int. Cl.[3] ..... H01F 7/08

[52] U.S. Cl. ..... 335/271; 335/277; 400/124

[58] Field of Search ..... 335/271, 277; 400/124; 101/93.05

[56] References Cited

U.S. PATENT DOCUMENTS

| | | | |
|---|---|---|---|
| 1,074,396 | 9/1913 | West et al. | 310/30 |
| 3,501,724 | 3/1970 | Westphal | 335/277 X |
| 3,675,172 | 7/1972 | Petusky | 335/277 X |
| 3,755,700 | 8/1973 | Buschmann et al. | 310/30 |
| 4,016,965 | 4/1977 | Wirth et al. | 197/1 |
| 4,239,401 | 12/1980 | Veale | 335/262 |

FOREIGN PATENT DOCUMENTS

| | | | |
|---|---|---|---|
| 2231521 | 12/1974 | France | 335/271 |

*Primary Examiner*—George Harris
*Attorney, Agent, or Firm*—Biebel, French & Nauman

[57] ABSTRACT

A high speed axial-type printing solenoid includes a rebound and energy absorbing arrangement which employs a block of energy-absorbing "dead" elastomeric material held in a partially compressed state by an impact plate. The impact plate is mounted to engage and position the plunger or armature at a rest position and to transmit impact forces to the partially compressed block of elastomeric material.

3 Claims, 3 Drawing Figures

PRINT WIRE SOLENOID

Matter enclosed in heavy brackets [ ] appears in the original patent but forms no part of this reissue specification; matter printed in italics indicates the additions made by reissue.

RELATED APPLICATION

This application is a continuation-in-part of our application Ser. No. 908,153 filed May 22, 1978 now Patent No. 4,200,401.

BACKGROUND OF THE INVENTION

This invention relates to the field of precision axial solenoids, and more particularly to printing solenoids, such as print wire solenoids for use in dot matrix impact-type printers and hammer-type solenoids for use in daisy-wheel printers.

A typical print head for a dot matrix-type of printer may have either seven or nine wires, each operated by an individual print wire solenoid. High speed operation of such printers may require the ability to produce in excess of 600 characters per second with an average of six dots per character. An individual print wire may be required to produce in excess of 1,000 impacts per second, while maintaining a clear and distinct impact pattern.

Each impact dot produced by the wire represents a complete cycle of operation for the print wire solenoid, in which a coil is energized to move an armature from a rest position to a forward or actuated position. The print wire is carried on or operated by the armature and moved into impact with the printing medium. When the solenoid coil is de-energized, the armature is returned to its rest position by means of a spring. Total movement of the armature usually does not exceed 0.040" and more commonly is in the range of 0.200". The return momentum of the armature must be absorbed with minimum rebound so that the unit is capable of high speed operation, without being out of phase with its electronic signal.

In the mass production of such solenoids it is important that they be designed so as to be produced at low cost and yet provide repeatability of design performance from unit to unit. In other words, it is important to provide a design in which the speed of operation and force of application will remain within desired limits for all units manufactured throughout a production run. One critical design parameter of a solenoid of this type is the air gap spacing between the armature and stator. It is important that the working air gap, across which the motive force is generated, be accurately maintained from unit to unit. In the past, threaded external adjustments have been provided through which a desired air gap could be reestablished after the solenoid has been assembled. The problem of maintaining a precise internal air gap has resulted from the difficulty in controlling the stack-up of the tolerances of the many assembled parts, the total axial variations of which result in a loss of control of the desired air gap dimension within the assembled part.

The problem defined above with respect to the maintenance of a precise air gap in printing solenoids is also related to the problem of the maintenance of a fixed rest position for the solenoid armature with respect to a reference datum plane which does not change during the use of the solenoid. The datum plane may be established by a rebound absorbing material in applications where control of rebound or bounce is critical. Generally speaking, the control of rebound or bounce is significant in printing solenoids, but the maintenance of a given datum plane or rebound surface by use of an elastomer has proven in the past to be difficult due in part to the thermal expansion of the elastomeric material, and the fact that the elastomeric material has a tendency to take a set after the solenoid has been in use for a period of time.

SUMMARY OF THE INVENTION

This invention is directed to improved printing solenoids adapted for mass production which overcome the difficulties encountered above, which have excellent repeatability of performance and which are capable of stable high speed operation. A uniform air gap is maintained, without the necessity of providing either internal or external air gap adjustments.

In the solenoids of the present invention, rebound control and maintenance of a defined datum plane are accomplished by a structure which employs a shock deadening and energy absorbing elastomer material held by the solenoid structure in a partially compressed or precompressed state. In this manner, a fixed starting point for the solenoid plunger or armature is maintained for all conditions, and the adverse effects of elastomer expansion, and set or deformation after use, are substantially eliminated. In the solenoids of the present invention, a relatively non-compressible impact plate is positioned by the parts of the solenoid to bear against a rebound and energy absorbing "dead" elastomer material in such a manner that the elastomer material is held under slight precompression at all times.

It is accordingly an important object of this invention to provide a solenoid construction, as outlined above, incorporating a rebound assembly which defines a rebound surface not adversely affected by expansion of the rebound elastomer or the deformation of the elastomer due to repeated impacts, and in which the impact absorbing capability remains substantially predictable and constant throughout the life of the solenoid.

Another object of the invention is to provide an axial solenoid in which a rebound elastomer is held in a partially pre-compressed condition and to provide a fixed datum or rebound plane for the armature.

These and other objects and advantages of the invention will be apparent from the following description, the accompanying drawings and the appended claims.

DESCRIPTION OF THE PREFERRED EMBODIMENTS

Figure 1:
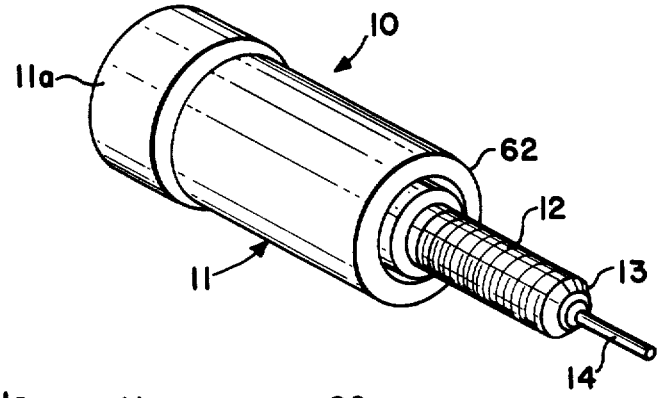
FIG. 1 is a perspective view of a print wire solenoid made according to this invention.

A tubular print wire solenoid constructed according to this invention is illustrated generally at 10 in FIG. 1. The assembly includes an outer sheet metal case 11 formed of suitable magnetic flux-carrying material, such as mild steel. The forward end of the solenoid incorporates a threaded extension 12 by means of which the solenoid 10 may be mounted. A flat 13 may be formed on the extension 12 for the purpose of mounting the solenoid in a correspondingly shaped opening of a panel, support or the like. The print wire 14 is shown as extending through the portion 12. If desired, other mounting arrangements may be employed.

Figure 2:
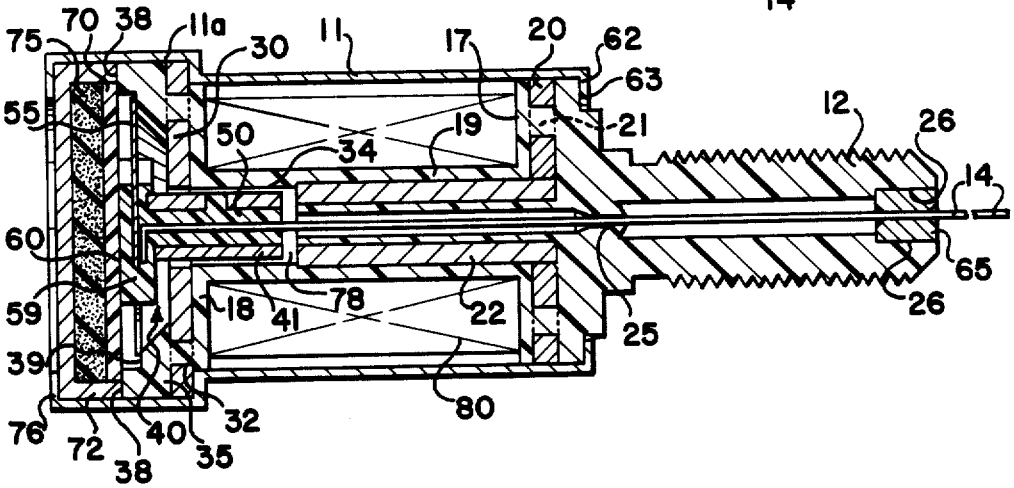
FIG. 2 is an enlarged longitudinal sectional view of the solenoid of FIG. 1.

As seen in FIG. 2, the solenoid 10 has an injected molded unitary stator and bobbin assembly which includes an injection molded plastic bobbin having a front wall 17 and an axially spaced rear wall 18 joined by a tubular center section 19, thereby defining a spool or bobbin-shaped region into which a coil 80 of insulated electric magnet wire is wound.

The front wall 17 forms an integral part of a forwardly extending combined mounting and printing wire extension 12 by means of which a solenoid may be suitably mounted on a printing head. The front wall 17 encapsulates a ferrous metal core ring 20. Ring 20 is formed with a number of axial openings 21 therein through which the plastic material of the bobbin may flow during the injection molding.

The tubular section 19 of the bobbin encapsulates a cylindrical core 22 also formed of ferrous metal. The core 22 has a forward end received in telescopic relation with the inside diameter of the core ring 20. Within the central region of the front wall 17, the plastic material is necked down to form an internal print wire guide 25. The guide 25 forms a rather loose fit with the wire 14 and has the function of reducing sine wave oscillations in the wire 14 on impact. The forward end of the extension 12 is provided with an enlarged recess 26 into which a suitable wire guide or bearing 65 is received.

The rear wall 18 integrally encapsulates a stator ring 30 also formed of ferrous metal. The stator ring 30 is of somewhat larger diameter than the core ring 20 and is provided with axial openings 32, though which the plastic material may flow during injection. A central opening in the stator ring 30, together with the tubular section 19 rearward of the core 22, forms a cylindrical armature-receiving opening or bearing surface 34.

An annular portion 35 of the plastic material extends axially rearwardly of the ring 30 at the diameter of the ring 30 and forms a rear or outer radial land or surface 38 and an inner annular land or ledge 39 of somewhat smaller diameter than the outer land 38. The land 38 defines a datum plane, and in the injection molding of the stator assembly, all of the insert parts are positioned with respect to this plane.

The other major subassembly consists of an injection molded, unitary armature and retraction spring assembly 40. The assembly 40 includes a sleeve-shaped ferrous metal armature 41. Holes in the wall of the armature 41, and slots in the inner end, provide areas for the plastic material to grip the armature 41 and retain it during the severe shock and vibration experienced during printing. The armature 41 is retained in the assembly 40 by injection molding with plastic material which forms a body 50. At the same time, the inner end of the print wire 14 is captured within the armature. The wire 14 has a turned end positioned in abutment with a cantilever or cruciform-shaped return spring 55. The spring 55, armature 41 and wire 14 are bound into the unitary assembly 40 by means of the plastic body 50. The spring 55 is formed with a plurality of radially extending arms. When the solenoid armature assembly is positioned in its first position, as shown, the rear surface 60 of the armature assembly 40 positioned at the datum surface from which all of the metal parts of the assembly 40 are referenced, including the armature sleeve 41 and the spring 55.

The case 11 is provided with a region of slightly larger diameter 11a to receive the enlarged wall 35, thereby accommodating the somewhat enlarged stator ring 30. The case 11 may be drawn of mild ferrous material and is formed with a forward inwardly turned end 62 which engages the radial front surface 63 of the wall 17. The extension 12 extends forwardly through the opening defined by the inwardly turned end 62 of the case 11, and when the bobbin assembly is inserted within the case, the outer surface of the core ring 20 and the common outer surface of the front wall 17 form a close fit with the inside diameter at the forward end of the case 11 in such a manner that the ring 20 is magnetically coupled to the case 11.

The armature assembly 40 is inserted into the position shown in FIG. 2, and in this first position, the ends of the retraction spring 55 rest on the annular ledge or surface 39 of the rear wall extension 35. The print wire 14 extends forwardly through the core 22, the restricted opening defined by the necked-down portion 25, and low friction, long wearing bearing 65. Bearing 65 forms a close running fit with the wire 14. The outside diameter of the armature element 41 forms a close running fit with the cylindrical bearing surface 34 of the bobbin assembly. The opening within the stator ring 30 forms a clearance fit with the armature element 41, which clearance is shown in somewhat exaggerated form in FIG. 2. In actual practice it is preferred to have a closely coupled relation between the armature and the stator ring. The outside diameter of the stator ring 30 forms a close fit with the case 11 at the enlarged portion 11a, thus completing the magnetic flux path.

A thin impact disc or plate 70 of relatively [imcompressible] *incompressible* material is inserted with its peripheral edge resting on the rear datum surface 38. In this position, the impact plate 70 engages the rebound or back planar surface 60 of the assembly 40 so that the surface 60 and the datum surface 38 are in a common plane. A cup 72 receives a block or pad 75 of shock deadening, energy absorbing elastomer material, such as rubber or cellular foam material. The cup 72 forms a close fit within the case portion 11a and is retained in place by a crimped or turned-in end 76 of the case 11. The forward annular edge of the cup 72 is also in abutment with the surface 38, and in this position the depth of the cup and the thickness of the block 75 contained therein provides a slight precompression in the block 75 and assures that the impact disc 70 rests in a normally seated position against the surface 38, as shown in FIG. 2.

Thus, the impact disc 70, which may be formed of thin metal or plastic, such as du Pont "Delrin 500", together with the block 75, defines an impact and rebound means within the case 11, and the disc 70 defines a rearward abutment for the armature assembly 40 at the datum surface 38. In the assembled position, the arms of the spring 55 are slightly deflected or prestressed such as to tend to urge the armature 40 in its seated or retracted position. In this position, and axial or working air gap 78 is formed between the forward end of the armature element 41 and the adjacent rearward end of the core 22. The gap 78 defines the extent of movement of the armature toward its second extended position and may be in the order of 0.020" to 0.025". This gap, in assembly, is accurately maintained since the stator or bobbin assembly on the one hand and the armature assembly 40 on the other hand are designed and injection molded in reference to common datum planes.

The rebound surface 60 defined by the body 50, contacts the disc 70 and transmits the impact energy of the returning armature assembly 40 to the block 75 which absorbs this energy.

The solenoid coil 80 is operated from a source of DC voltage and upon energization, the armature assembly 40 is attracted to the core 22 toward its second position by reason of magnetic flux extending across the air gap 78. The case 11 comprises the magnetic return path as it is magnetically coupled to the core ring 20 and the stator ring 30. Theforward movement of the armature assembly 40 drives the print wire 14 into impact with the printing medium and results in slight deflection of the arms of the retraction spring 55. When the solenoid coil is de-energized, the spring 55 returns the armature assembly 40 to its rest position and the impact is transmitted to the impact plate or disc 70, with the energy absorbed by the block 75. Thus the block 75 and the surrounding elements form an armature damper means for positioning the armature at its first position and substantially eliminating rebound therefrom. The plate 70, and the cup 72, in conjunction with the case portion 11a provide a means for restraining the block 75 of enerby absorbing material in a compressed state.

Figure 3:
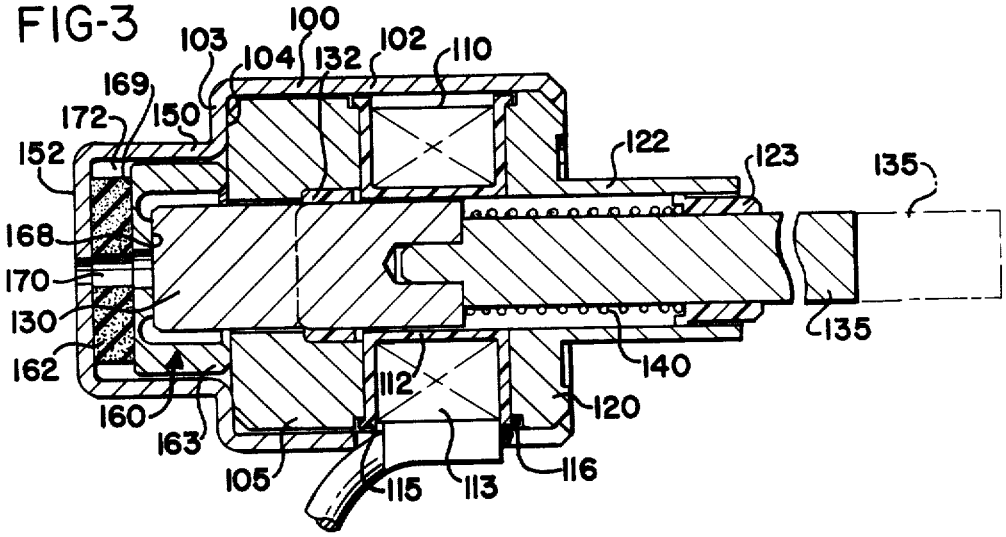
FIG. 3 is a longitudinal sectional view of a hammer-type solenoid made according to this invention.

FIG. 3 illustrates the application of the invention to a printing solenoid of the type used to apply an impact to a daisy-wheel printer. While the solenoid of FIG. 3 is designed to operate at a relatively lower rate of around 30 cycles per second, the armature and the attached plunger or shaft are formed with a somewhat greater mass in order to provide the desired impact energy. Thus, the control of the initial position of the armature and the control of rebound are of great importance.

The printing solenoid of FIG. 3 also is formed with a drawn metal case 100 corresponding generally to the case 11 of the solenoid of FIGS. 1 and 2. The case 100 is formed with a forward major cylindrical portion 102 of a larger diameter and is stepped down in diameter by an annually inward or radially directed portion 103, the inside radial surface 104 of which defines a datum plane. An annular flux plate 105 is received within the case with a rear planar surface in abutment with the surface 104. A coil and bobbin assembly 110 is also received within the case 100 and includes a molded bobbin 112 which receives an electric coil 113. The flux plate 105 is piloted on a rearwardly extending flange 115 formed on the rear wall of the bobbin 112.

The bobbin 112 also has a front wall with a forwardly extending flange 116 which forms an interference fit on a locating ledge on an annular pole member 120. The pole member 120 includes a hollow, forwardly-extending mounting portion 122 which receives therein a sleeve bearing 123.

A common, axially aligned opening is defined within the flux plate 105, the bottom 112 and the pole member 120 to receive and support for axial movement a plunger or armature 130. The armature 130 rides within a sleeve bearing 132 carried by the plate 105 and has a forwardly extending plunger or shaft 135 formed as a press fit with the armature, the shaft being proportioned to ride within the bearing 123. The armature 130 is shown in full line in a first fully retracted or seated position, maintained by a coil compression spring 140 received about the shaft 135 and bearing at one end against the sleeve bearing 123 and at its other end against the armature 130. The armature 130 moves, with energization of the coil 113, to a second position shown by dotted lines, and impacts against a print wheel to form a printed impression.

Energy-absorbing rebound means, acting as an armature damper, are formed within the rearward cylindrical extension 150 of the case 100. The rear extension 150 extends from the generally radial wall 103 to a closed end 152 to receive a cup-shaped impact plate or member 160 and a generally disc-shaped block 162 of a rebound deadening or absorbing material. The cup-shaped impact plate 160 may be made of any fairly rigid and impact resistant material, such as hard plastic or a non-magnetic metal, and has a forwardly extending wall 163, the terminal end of which bears against the adjacent surface of the flux plate 105 at the datum plane 104. The walls 163 of the cup-shaped plate 160 define a recess is proportioned to receive one end of the armature 130 therein and the back surface of the armature normally bears against an inside bottom surface 168 of the plate 160. The radial flat surface 169 of the plate 160 bears against the adjacent surface of the block 162, which block is positioned and captured between the plate 160 and the wall 152. The axial dimensions of the block 162 and the cup 160 with respect to the datum surface 104 and the inside surface of the wall 152 causes the block 162 to be slightly precompressed and thus, when assembled, permanently under compression. A common axial air-relief opening 170 is formed through the wall 152, the block 162, and the plate 160. Preferably the block 162 in this embodiment has an outside diameter slightly less than the inside diameter of the extension portion 150 of the case 100, thereby leaving a small annular air gap 172 into which the block 162 may bulge or deflect under impact.

The momentum of the movement of the armature or plumger 130, in its returning movement, is imparted to the plate 160 and is substantially absorbed by the block 162. The block 162 is formed of a shock deadening and energy absorbing elastomeric material, such as foam rubber material. A suitable material for this purpose is the product No 321 available from Industrial Electronic Rubber Company of Twinsburg, Ohio. After each stroke or cycle of operation of the solenoid, the plate 160 returns to its datum position under the restoring influence of the block 162. Thus the armature damper means comprising the plate 160 and the block 162 assures the maintenance of a fixed or defined starting or a rest position for the armature 130 which does not change in use and which does not change with thermal expansion of the material of the block 162. The controlled compression of the material of the block 162 also prevents an internal change of condition which has been observed in other solenoids where the elastomer takes on a set or deformation, during use.

While the forms of apparatus herein described constitute preferred embodiments of this invention, it is to be understood that the invention is not limited to these precise forms of apparatus, and that changes may be made therein without departing from the scope of the invention.

What is claimed is:

1. In a high speed axial type solenoid suitable for use as a printing solenoid and the like, having an axially movable armature therein, the improvement comprising:

means in said solenoid defining a datum plane, solenoid armature impact plate [means] *formed of relatively incompressible material* positioned at said plane and defining a rest position for the armature, a *fixed* solenoid wall, means defining a *single* quantity of energy absorbing elastomeric material positioned between said wall and said plate [means], *with one surface thereof in contact with said wall and an opposite surface in contact with said plate,* and means at said datum plane engaging said plate [means] and normally retraining said material in precompression.

2. In a high speed axial-type solenoid suitable for use as a printing solenoid and the like, wherein a solenoid plunger is movable from a rest position to an actuated position, and including spring means for returning said plunger to said rest position, the improvement comprising:

a block retainer wall, a block of energy absorbing elastomeric material positioned at said wall, a plunger impact plate positioned to engage said block on a side thereof remote from said wall, means retaining said plate against said block partially precompressing said block, said plate on a surface thereof remote from said block positioned to be engaged by said plunger at the rest position of said plunger.

3. A solenoid device, comprising:

solenoid stator means including a solenoid coil, an armature mounted for movement between first and second positions, said armature being moved from said first position toward said second position in response to electrical energization of said solenoid coil, spring means, biasing said armature toward said first position, for returning said armature thereto in response to de-energization of said solenoid coil, and armature damper means, mounted on said stator to be struck by said armature as said armature is returned to said first position by said spring means, for positioning said armature at said first position and substantially eliminating rebound therefrom, said armature damper means including a quantity of energy absorbing elastomeric material, and means restraining said quantity of energy-absorbing material in a compressed state. *comprising a force transmitting plate mounted on said stator for contact with said armature as said armature is moved into said first position, said force transmitting plate being relatively incompressible for transmitting the impact of said armature thereagainst to said quantity of energy-absorbing elastomer material.*

[4. The solenoid device of claim 3 in which said means restraining said quantity of energy-absorbing material comprises:

force transmitting means mounted on said stator for contact with said armature as said armature is moved into said first position, said force transmitting means being relatively imcompressible for transmitting the impact of said armature thereagainst to said quantity of energy-absorbing elastomeric material.]

* * * * *